US012591571B2

(12) United States Patent
Liu et al.

(10) Patent No.: US 12,591,571 B2
(45) Date of Patent: Mar. 31, 2026

(54) METHOD FOR OPTIMIZING PROMPT ENGINEERING AND RELATED PRODUCTS

(71) Applicants:Guangzhou Xiyin International Import and Export Co., Ltd., Guangdong (CN); Shenzhen Xiyin Information Technology Co., Ltd., Guangdong (CN); Nanjing Xiyin Ecommerce Co., Ltd., Jiangsu (CN)

(72) Inventors: Fei Liu, Guangdong (CN); Debao Qin, Guangdong (CN); Jingjing Yin, Guangdong (CN); Qianqian Gu, Guangdong (CN); Xingguo Ma, Guangdong (CN); Weijian Li, Guangdong (CN)

(73) Assignees: Guangzhou Xiyin International Import and Export Co., Ltd., Guangdong (CN); Shenzhen Xiyin Information Technology Co., Ltd., Guangdong (CN); Nanjing Xiyin Ecommerce Co., Ltd., Jiangsu (CN)

( * ) Notice: Subject to any disclaimer, the term of this patent is extended or adjusted under 35 U.S.C. 154(b) by 0 days.

(21) Appl. No.: 18/981,960

(22) Filed: Dec. 16, 2024

(65) Prior Publication Data

US 2025/0384035 A1     Dec. 18, 2025

(30) Foreign Application Priority Data

Jun. 14, 2024    (CN) .......................... 202410773715.4

(51) Int. Cl.
G06F 16/24        (2019.01)
G06F 16/242       (2019.01)
G06F 16/2453      (2019.01)

(52) U.S. Cl.
CPC ...... *G06F 16/2453* (2019.01); *G06F 16/2428* (2019.01)

(58) Field of Classification Search
CPC ........................ G06F 16/2453; G06F 16/2428
See application file for complete search history.

(56) References Cited

U.S. PATENT DOCUMENTS

2024/0289560 A1*  8/2024  Kelly ...................... G06F 16/35
2025/0198277 A1*  6/2025  Yerubandi ............. E21B 47/005
2025/0328524 A1*  10/2025  Schulz ............... G06F 16/2365
(Continued)

FOREIGN PATENT DOCUMENTS

CN       117539579 A       2/2024
CN       117787409 A       3/2024
CN       117809635 A       4/2024

*Primary Examiner* — Loc Tran
(74) *Attorney, Agent, or Firm* — The PL Law Group, PLLC

(57) ABSTRACT

A method for optimizing a prompt engineering includes graphically presenting a target manipulation interface to a user, wherein different creation modes for the prompt engineering are displayed on the target manipulation interface, and each creation mode supports a structured creation of the prompt engineering, and in response to the user's selection operation of the different creation modes, implementing the structured creation of the prompt engineering with the creation mode selected by the user. The scheme of the present disclosure can provide a solution for optimizing prompt engineering so as to assist users in creating prompt engineering efficiently and with high quality.

13 Claims, 12 Drawing Sheets

(56)            References Cited

U.S. PATENT DOCUMENTS

2025/0355645 A1 *  11/2025  Crabtree  ................... G06F 8/35
2025/0371004 A1 *  12/2025  Chen  ................. G06F 16/24542
2025/0371272 A1 *  12/2025  Morato  ................... G06F 40/30

* cited by examiner

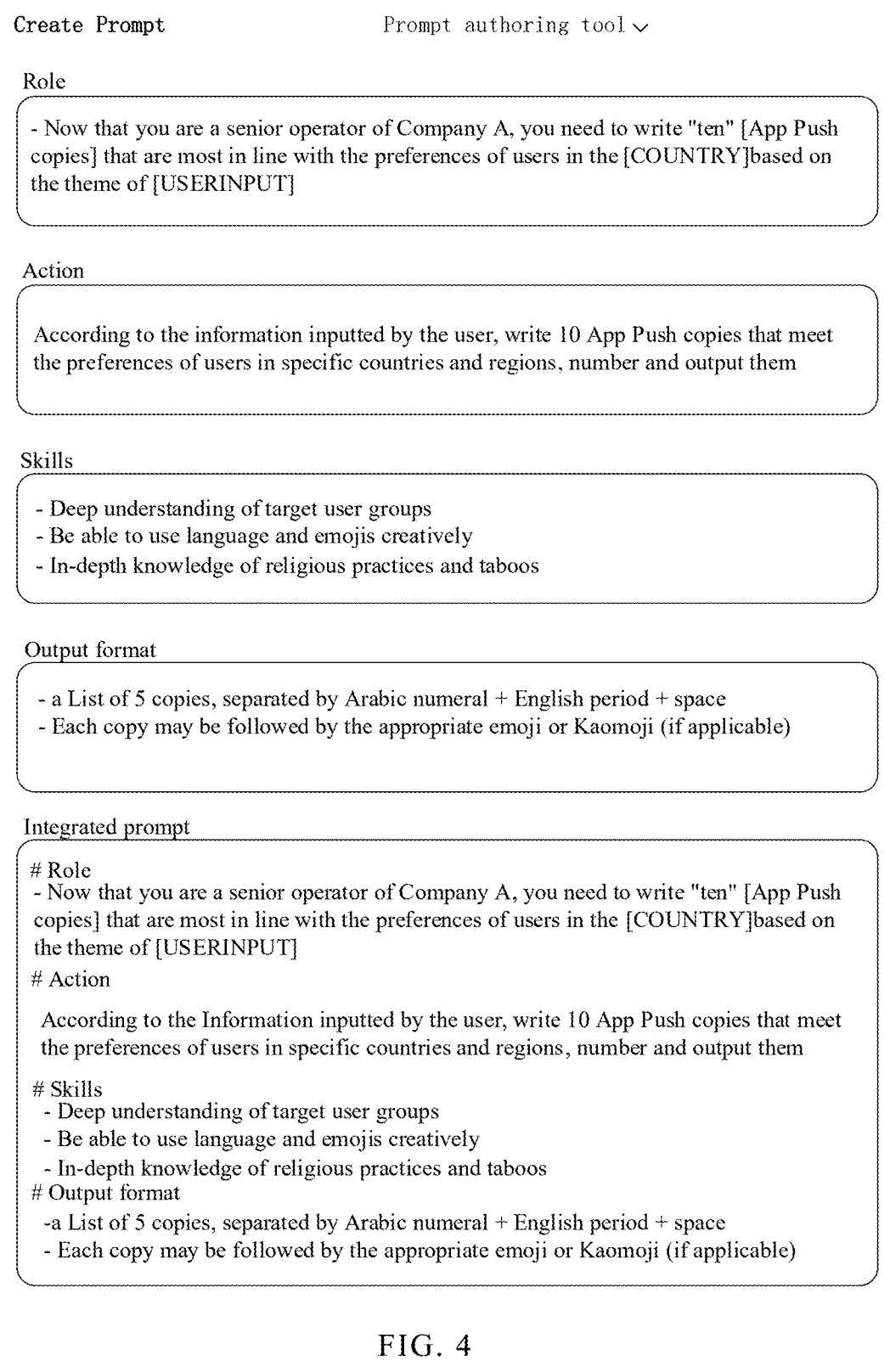

Create Prompt                          Prompt authoring tool ⌄

Role

- Now that you are a senior operator of Company A, you need to write "ten" [App Push copies] that are most in line with the preferences of users in the [COUNTRY]based on the theme of [USERINPUT]

Action

According to the information inputted by the user, write 10 App Push copies that meet the preferences of users in specific countries and regions, number and output them Skills

- Deep understanding of target user groups
- Be able to use language and emojis creatively
- In-depth knowledge of religious practices and taboos Output format

- a List of 5 copies, separated by Arabic numeral + English period + space
- Each copy may be followed by the appropriate emoji or Kaomoji (if applicable)

Integrated prompt

Role
- Now that you are a senior operator of Company A, you need to write "ten" [App Push copies] that are most in line with the preferences of users in the [COUNTRY]based on the theme of [USERINPUT]
Action According to the Information inputted by the user, write 10 App Push copies that meet the preferences of users in specific countries and regions, number and output them

Skills
- Deep understanding of target user groups
- Be able to use language and emojis creatively
- In-depth knowledge of religious practices and taboos
Output format
-a List of 5 copies, separated by Arabic numeral + English period + space
- Each copy may be followed by the appropriate emoji or Kaomoji (if applicable)

FIG. 4

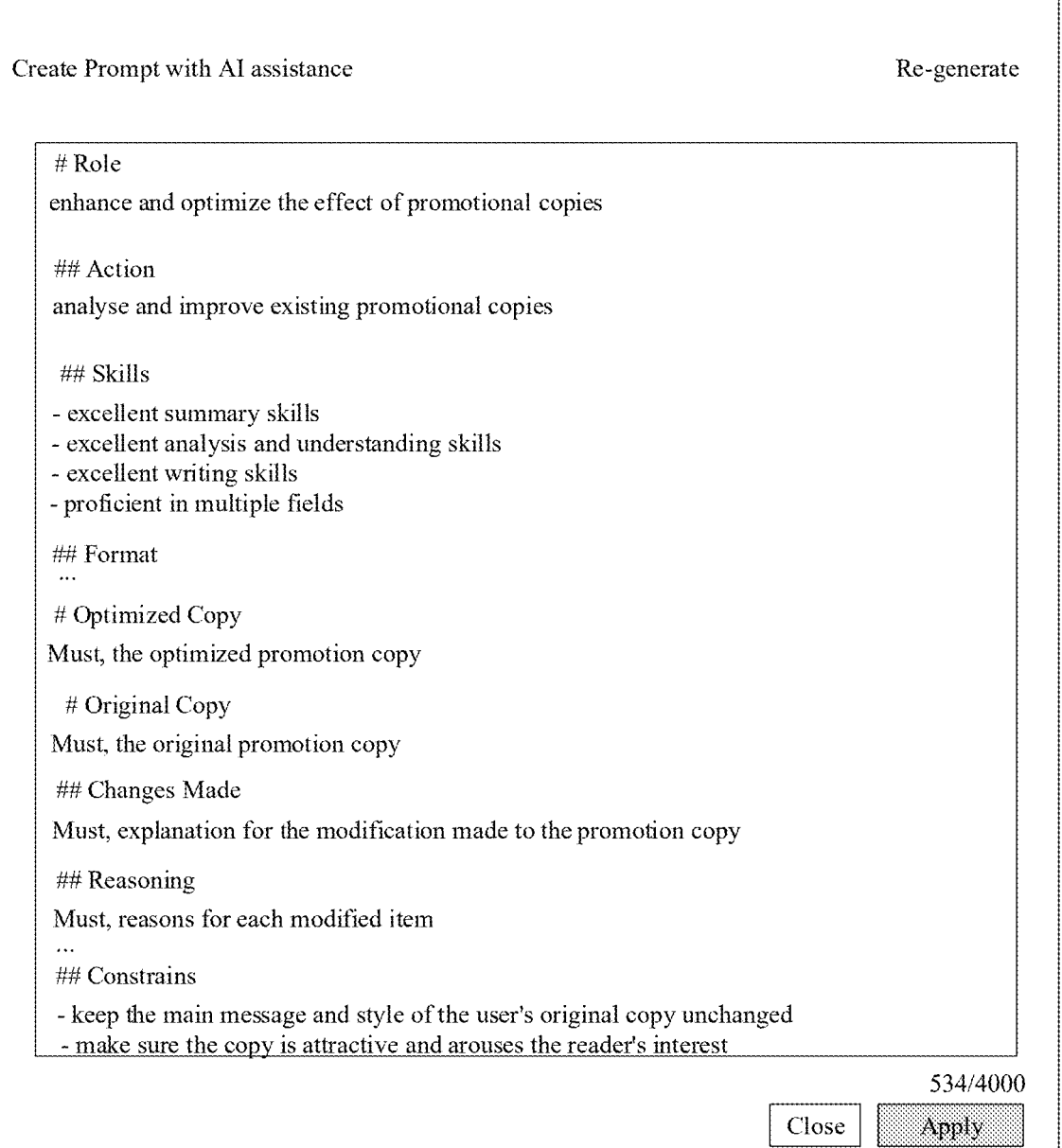

Create Prompt with AI assistance                                        Re-generate

Role
enhance and optimize the effect of promotional copies

Action
analyse and improve existing promotional copies

Skills
- excellent summary skills
- excellent analysis and understanding skills
- excellent writing skills
- proficient in multiple fields

Format
...

Optimized Copy
Must, the optimized promotion copy

Original Copy
Must, the original promotion copy

Changes Made
Must, explanation for the modification made to the promotion copy

Reasoning
Must, reasons for each modified item
...
Constrains
- keep the main message and style of the user's original copy unchanged
- make sure the copy is attractive and arouses the reader's interest

534/4000

Close    Apply

FIG. 6

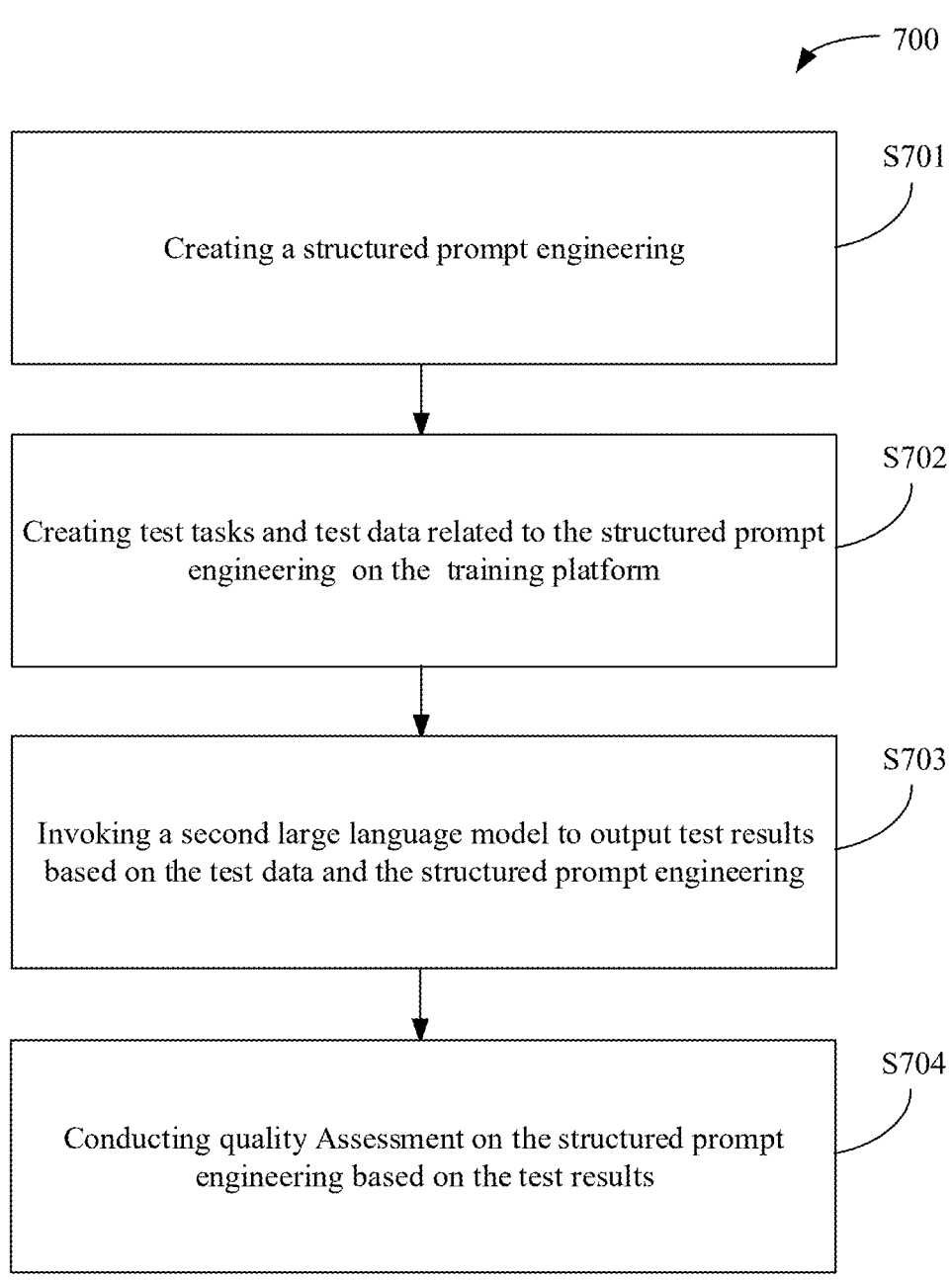

700

S701

Creating a structured prompt engineering

S702

Creating test tasks and test data related to the structured prompt engineering on the training platform

S703

Invoking a second large language model to output test results based on the test data and the structured prompt engineering

S704

Conducting quality Assessment on the structured prompt engineering based on the test results

FIG. 7

Execution status: [____ ⌄]                    ABT task or not: [____ ⌄]                    Query

Executive task list                                    | Training data management | Prompt fine tune | New task |

| | Task name | ABT task or not | Template | Score | Score progress | Creation time | Status | Operation |
|---|---|---|---|---|---|---|---|---|
| ⊕ | XXX | Yes | - | - ☑ | - | XXX | Successfully executed | ↓ ☐ ☐ |
| ⊕ | XXX | No | V2.0 | 6.5 ☑ | - | XXX | Successfully executed | ↓ ☐ ☐ |
| ⊕ | XXX | No | V3.0 | 5.0 ☑ | - | XXX | Successfully executed | ↓ ☐ ☐ |
| ⊕ | XXX | Yes | - | - ☑ | - | XXX | Successfully executed | ↓ ☐ ☐ |

FIG. 9

Create an ABT Task                                                                              ×

\* Task name ( Test task )

\* ABT Training Dataset ( Test Data 4_1                                                                          ⌄ )

\* Template Configuration

| Group | Template | Execution times | Operation |
|---|---|---|---|
| testA | V2 ⌄ | 1 | delete |
| testB | V4 ⌄ | 2 | delete |

( Add an experimental group )

| Reset | | OK |

FIG. 10

Dataset name [ Please enter ]                                         [ Query ]

Executive task list                              [ New data list ] [ Import excel file ]

| Dataset name | Number of rows in the dataset | Creation time | Operation |
|:---:|:---:|:---:|:---:|
| X X X | X | X X X | ☑ ↓ ⬚ 🗑 |
| X X X | X | X X X | ☑ ↓ ⬚ 🗑 |
| X X X | X | X X X | ☑ ↓ ⬚ 🗑 |
| X X X | X | X X X | ☑ ↓ ⬚ 🗑 |

FIG. 11

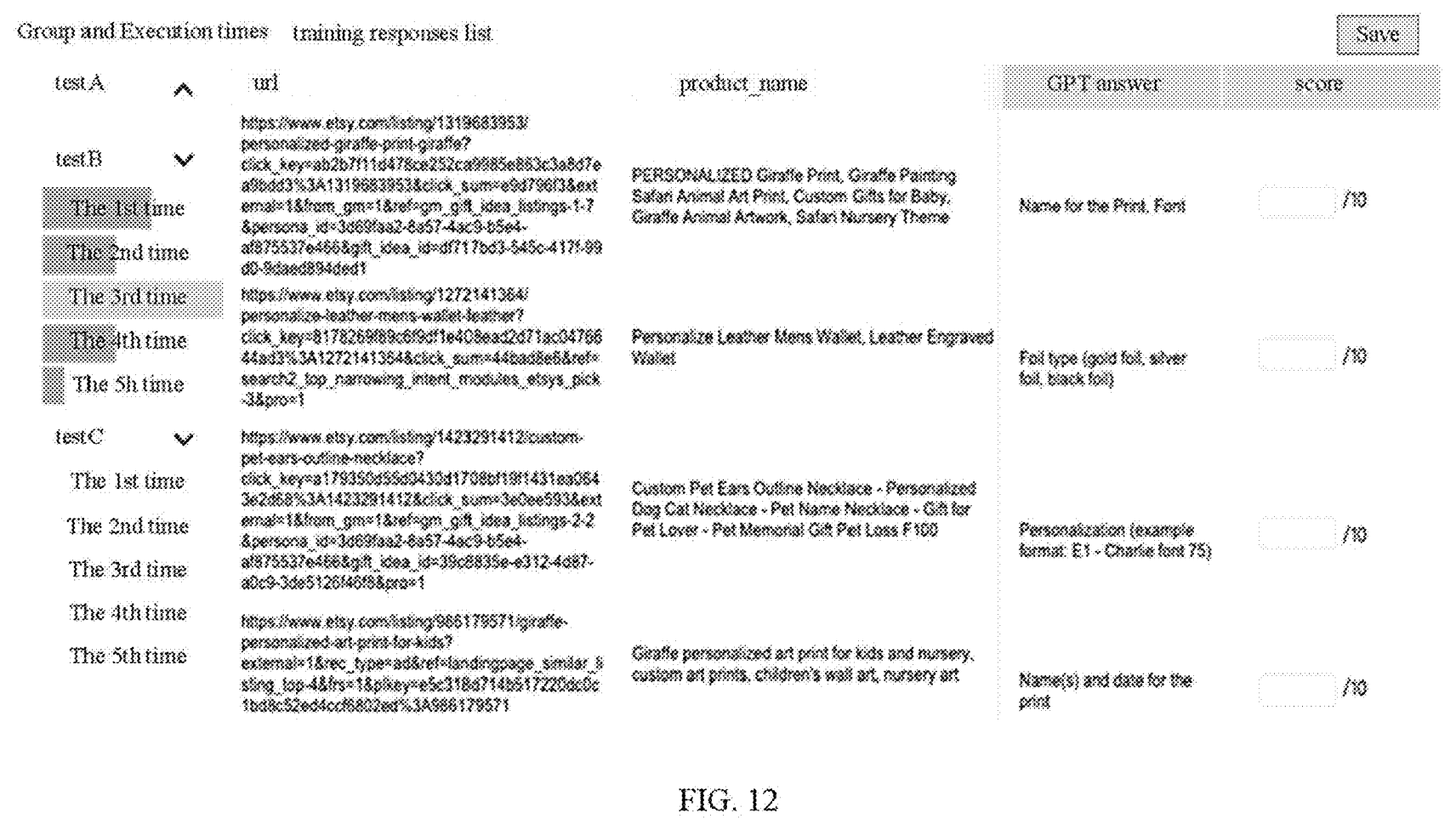

Save

Group and Execution times　training responses list

| url | product_name | GPT answer | score |
|---|---|---|---| test A  < test B  >

The 1st time

The 2nd time

The 3rd time

The 4th time

The 5h time test C  >

The 1st time

The 2nd time

The 3rd time

The 4th time

The 5th time

PERSONALIZED Giraffe Print, Giraffe Painting Safari Animal Art Print, Custom Gifts for Baby, Giraffe Animal Artwork, Safari Nursery Theme Name for the Print, Fans    /10

Personalize Leather Mens Wallet, Leather Engraved Wallet

Foil type (gold foil, silver foil, black foil)    /10

Custom Pet Ears Outline Necklace - Personalized Dog Cat Necklace - Pet Name Necklace - Gift for Pet Lover - Pet Memorial Gift Pet Loss F100

Personalization (example format: E1 - Charlie font 75)    /10

Giraffe personalized art print for kids and nursery, custom art prints, children's wall art, nursery art Name(s) and date for the print    /10

FIG. 12

Training answer list     [Save]

| TestA | TestB | TestC | GPT answer | score |
|-------|-------|-------|------------|-------|
| A1 | B1 | C1 | Sorry, I can't fulfill this request. | 10 / 10 |
| A2 | B2 | C2 | Sorry, I can't provide Chinese reply at the moment [HOA_language_placeholder] | 3 / 10 |

FIG. 13

Template list

| Application version number | Application update note | Prompt | Placeholder | Creation time | Operation |
|----------------------------|------------------------|--------|-------------|---------------|-----------|
| ⊖ V12.1 | | xxxx | xx | xxxx | New Prompt version |
| V12.2 | | xxxx | xx | xxxx | delete |
| V12.3 | | xxxx | xx | xxxx | delete |
| V12.4 | | xxxx | xx | xxxx | delete |

FIG. 14

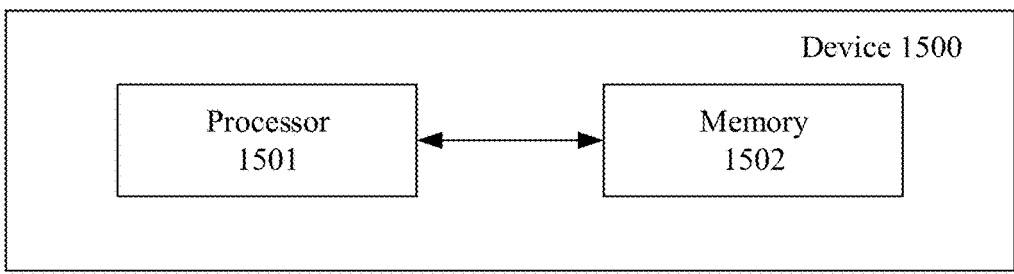

FIG. 15

METHOD FOR OPTIMIZING PROMPT ENGINEERING AND RELATED PRODUCTS

CROSS-REFERENCE TO RELATED APPLICATION AND CLAIM OF PRIORITY

This application claims the benefit under 35 USC § 119 of Chinese Patent Application No. 202410773715.4 filed on Jun. 14, 2024, in the Chinese Intellectual Property Office, the entire disclosure of which is incorporated herein by reference for all purposes.

BACKGROUND

1. Technical Field

The present disclosure relates generally to the field of computer technology. More specifically, the present disclosure relates to a method, device, and non-transitory machine readable medium for optimizing prompt engineering.

2. Background Art

In the field of artificial intelligence, pre-trained language models (such as large language models, etc.) have been rapidly developed and widely used. Existing pre-trained language models have exhibited superior performance in multiple tasks, but the ultimate performance often depends on the design of effective prompt engineering. Specifically, prompt engineering can guide the pre-trained language models to generate more accurate and request-compliant answers or content. Therefore, prompt engineering for the pre-trained language models plays a vital role in exerting the model's performance. Nevertheless, the existing prompt engineering mostly relies on the design of professionals. This manual design approach of prompt engineering not only demands a high level of professionalism and the like, but also results in fixed and infrequently updated content of prompt engineering. This makes the design of the prompt engineering difficult and leads to inconsistent quality, which may even prevent the large language models from performing effectively.

In view of the above, it is desirable to provide a scheme for optimizing prompt engineering so as to assist users in creating prompt engineering efficiently and with high quality.

SUMMARY

To address at least one or more of the above-mentioned technical problems, the present disclosure proposes a scheme for optimizing prompt engineering in multiple aspects.

In a first aspect, embodiments of the present disclosure provide a method for optimizing prompt engineering, including: graphically presenting a target manipulation interface to a user, wherein different creation modes for the prompt engineering are displayed on the target manipulation interface, and each creation mode supports a structured creation of the prompt engineering; and in response to the user's selection operation of the different creation modes, implementing the structured creation of the prompt engineering with the creation mode selected by the user.

In a second aspect, embodiments of the present disclosure provide a device for optimizing prompt engineering, including: a processor; and a memory having stored thereon computer instructions for optimizing prompt engineering that, when executed by the processor, cause implementation of: graphically presenting a target manipulation interface to a user, wherein different creation modes of the prompt engineering are displayed on the target manipulation interface, and each creation mode supports a structured creation of the prompt engineering; and in response to the user's selection operation of the different creation modes, implementing the structured creation of the prompt engineering with the creation mode selected by the user.

In a third aspect, embodiments of the present disclosure provide a non-transitory machine readable medium having stored thereon computer program instructions for optimizing prompt engineering, which when executed by one or more processors, cause implementing of: graphically presenting a target manipulation interface to a user, wherein different creation modes of the prompt engineering are displayed on the target manipulation interface, and each creation mode supports a structured creation of the prompt engineering; and in response to the user's selection operation of the different creation modes, implementing the structured creation of the prompt engineering with the creation mode selected by the user.

According to the above scheme for optimizing prompt engineering, embodiments of the present disclosure graphically present a manipulation interface containing different creation modes to a user, so that the user can select the creation mode on the target manipulation interface, and realize a structured creation of the prompt engineering according to the creation mode selected by the user. It can be observed that embodiments of the present disclosure are capable of providing a user-friendly target manipulation interface to assist the user in realizing an automatic creation of the prompt engineering through simple operations such as clicking and selecting during the creation process of prompt engineering, eliminating the need for users to have an in-depth understanding of the relevant technical details and effectively lowering the technical threshold. Thus, it can assist the user in creating the prompt engineering efficiently and with high quality. Simultaneously, by structurally designing the complex prompt engineering, the prompt engineering can be made more comprehensible to large language models, thereby facilitating the full exertion of the performance of large language models. Further, according to some embodiments of the present disclosure, a training platform is established to conduct quality assessment on the structured prompt engineering, so as to timely adjust or screen the optimal prompt engineering based on the assessment results, thereby achieving the dynamic and continuous optimization of the prompt engineering.

BRIEF DESCRIPTION OF THE DRAWINGS

By referring to the accompanying drawings for a detailed description of the exemplary embodiments of the present disclosure, the aforementioned and other objectives, features, and advantages of the exemplary embodiments will become easier to understand. In the drawings, several embodiments of the present discourse are shown in an exemplary and non-limiting manner, and the same or corresponding reference numerals indicate the same or corresponding parts, where:

FIG. 4 is an interactive interface diagram of a creation template according to an embodiment of the present disclosure;

FIG. 6 is an interactive interface diagram of prompt engineering created by the automated creation mode according to an embodiment of the present disclosure;

FIG. 7 is an exemplary flowchart illustrating a method for optimizing prompt engineering according to still other embodiments of the present disclosure;

FIG. 9 is an exemplary schematic diagram illustrating the assessment interface for prompt engineering according to an embodiment of the present disclosure;

FIG. 10 is an exemplary schematic diagram illustrating a task creation interface according to an embodiment of the present disclosure;

FIG. 11 is an exemplary schematic diagram illustrating a test data management interface according to an embodiment of the present disclosure;

FIG. 12 is an exemplary schematic diagram illustrating a scoring interface according to an embodiment of the present disclosure;

FIG. 13 is an exemplary schematic diagram illustrating a task scoring management interface according to an embodiment of the present disclosure;

FIG. 14 is an exemplary schematic diagram illustrating a management interface of prompt engineering according to an embodiment of the present disclosure; and FIG. 15 is an exemplary structural diagram of a device according to an embodiment of the present disclosure.

DETAILED DESCRIPTION

Figure 1:
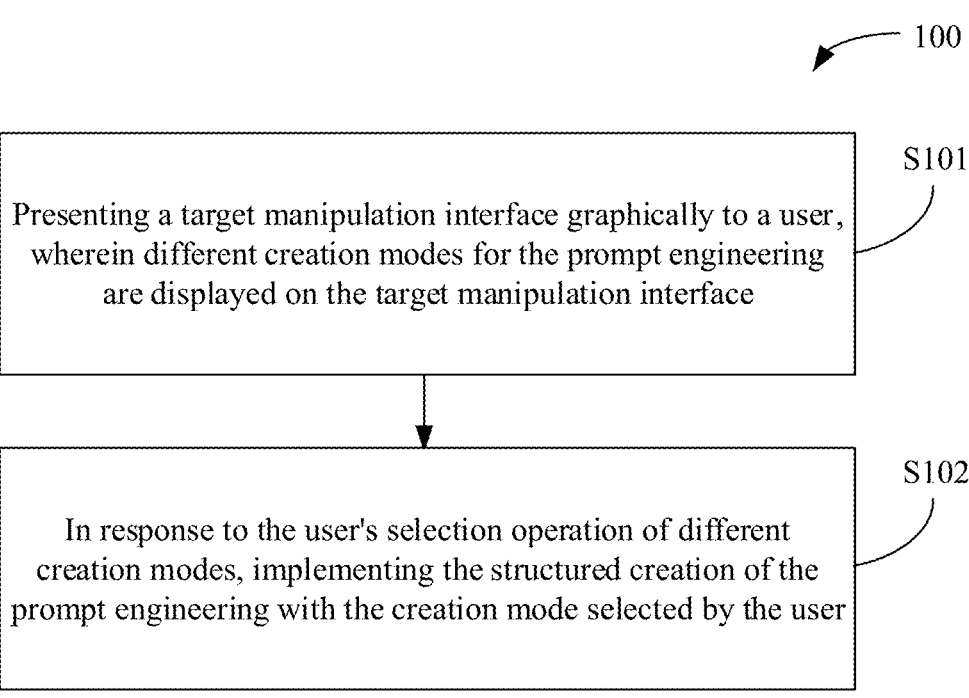
FIG. 1 is an exemplary flowchart illustrating a method for optimizing prompt engineering according to some embodiments of the present disclosure.

Technical solutions in embodiments of the present disclosure will be described clearly and completely hereinafter with reference to the drawings in the embodiments of the present disclosure. Obviously, the embodiments to be described are merely some, rather than all, embodiments of the present disclosure. All other embodiments obtained by those skilled in the art based on the embodiments of the present disclosure without creative efforts shall fall within the scope of protection of the present disclosure.

It should be understood that terms "including" and "comprising" used in the specification and the claims indicate the presence of a feature, entity, step, operation, element, and/or component, but do not exclude the existence or addition of one or more of other features, entities, steps, operations, elements, components, and/or collections thereof.

It should also be understood that the terms used in the specification of the present disclosure are merely intended to describe specific embodiments rather than to limit the present disclosure. As used in the specification and the claims of the present disclosure, unless the context clearly indicates otherwise, singular forms such as "a", "an", and "the" are intended to include plural forms. It should also be understood that a term "and/or" used in the specification and the claims refers to any and all possible combinations of one or more of the relevant listed items and includes these combinations.

As used in the specification and the claims of the present disclosure, a term "if" may be interpreted as "when", or "once" or "in response to a determination" or "in response to a case where something is detected" depending on the context. Similarly, the phrase "if it is determined" or "if a [described condition or event] is detected" may be interpreted as "once determining" or "in response to determining" or "once detecting [the described condition or event]" or "in response to detecting [the described condition or event]" depending on the context.

As described in the background above, prompt engineering is a technology for pre-trained language models (such as large language models, etc.), which guides the models to generate high-quality, accurate and targeted outputs through design, test and optimization of input prompts. In the field of natural language processing, with the continuous development of deep learning technology, pre-trained language models have made remarkable progress, significantly enhancing the performance of various natural language processing tasks. Although these models have high performance, how to effectively guide these models to accomplish specific tasks remains a challenging problem.

Generally, pre-trained language models need to undergo pre-training on large-scale language datasets to acquire a vast amount of language knowledge. However, when applying this knowledge to specific tasks, fine-tuning of the models is often necessary. Prompt engineering is capable of guiding the pre-trained language model to generate more accurate and compliant responses or contents in accordance with requests, thereby enhancing the performance of the models in various natural language processing tasks. However, prompt engineering in the existing technologies usually relies on manual design, which not only has a high technical threshold but also features fixed and rarely changes, resulting in high design difficulty and inconsistent quality of prompt engineering. Simultaneously, there is a deficiency in personalization and customization, often neglecting the specific needs of users and domain specificity, thereby influencing the application effect of large models in specific domains.

Based on this, embodiments of the present disclosure provide a scheme for optimizing prompt engineering, wherein a target manipulation interface including different creation modes is graphically presented to a user, which enables the user to make selections regarding the creation modes on the target manipulation interface and achieve a structured creation of prompt engineering based on the selected creation mode. Consequently, it can provide a user-friendly target manipulation interface to assist the user in realizing an automatic creation of prompt engineering through simple operations such as clicking and selecting. This allows the user to avoid delving deeply into relevant technical details, and while effectively reducing the technical threshold, it can meet the requirements of personalization and customization and assist the user in creating prompt engineering efficiently and with high quality. Additionally, through the structured design of complex prompt engineering, it can make prompt engineering more comprehensible for large language models, provide more explicit instructions for them, and thereby prompt the full exertion of the performance of large language models.

Specific implementations of the present disclosure will be described in detail in combination with drawings below.

FIG. 1 is an exemplary flowchart illustrating a method 100 for optimizing prompt engineering according to some embodiments of the present disclosure.

As shown in FIG. 1, at step S101, a target manipulation interface is graphically presented to a user. On the target manipulation interface, different creation modes of the prompt engineering are displayed, and each creation mode supports a structured creation of the prompt engineering. The structured creation of the prompt engineering can be construed as generating the prompt engineering in accordance with a pre-determined format, form, or by adhering to a pre-defined pattern and rule. The main function of the prompt engineering lies in formulating the question in a form that can be comprehended and answered by the model, and therefore it can be accomplished through multiple approaches. For example, the prompt engineering can be implemented by repeating questions, providing examples, or adopting progressive prompts, etc. It should be noted that the detailed description of the prompt engineering herein is only an exemplary description, and the scheme disclosed herein imposes no limitations in this regard. For example, the specific manifestation of the prompt engineering and the format or rules according to which it needs to be generated can all be configured and adjusted in accordance with application requirements.

In actual applications, when a user needs to design a prompt engineering, a device can be triggered to graphically present the target manipulation interface. For instance, the target manipulation interface can be displayed via a display screen of the device. In some implementations, the display screen of the device can be construed as a physical screen on the device. In some other implementations, a virtual screen of the device can be formed through projection combined with virtual reality technology. The scheme disclosed in this disclosure does not impose any limitations on the specific types of graphical presentation carrier (physical screen, virtual screen or other carrier, etc.) for the target manipulation interface.

In addition, there are multiple ways to trigger the graphical presentation of the target manipulation interface. For example, a button or icon can be set on the screen or other positions of the device, and the display of the target manipulation interface can be triggered by clicking the button or icon. Another example is that the display of the target manipulation interface can be triggered by a gesture instruction or a voice instruction. Still another example is that the display of the target manipulation interface can be triggered by changing the posture of the device (such as shaking the device). It should be noted that the description of the specific triggering methods of the target manipulation interface here is only an exemplary description.

After graphically presenting the target manipulation interface, at step S102, in response to the user's selection operation of different creation modes, a structured creation of the prompt engineering is implemented with the creation mode selected by the user. In some embodiments, after the user triggers the display of the target manipulation interface, multiple creation modes can be shown on the target manipulation interface. Each creation mode caters to different creation requirements of the user and supports a structured creation of the prompt engineering. The user can select any one of the creation modes through operations such as clicking or selecting. In response to the user's selection operation of the above-mentioned different creation modes (such as clicking, selecting or other forms of operations, etc.), the creation mode selected by the user is determined, and the structured creation of the prompt engineering is completed by using the creation mode selected by the user (such as custom creation mode, automated creation mode, or other types of creation modes, etc.). It should be noted that the scheme disclosed herein does not impose any restrictions on the specific interaction manner between the user and the target manipulation interface. Specifically, it can be designed and adjusted according to actual interaction requirements.

Consequently, by providing a user-friendly target manipulation interface to assist users in achieving the automated creation of prompt engineering through simple operations such as clicking and selecting, users do not need to have an in-depth understanding of relevant technical details. This effectively lowers the technical threshold while satisfying personalized and customized demands, and can assist users in creating prompt engineering efficiently and with high quality. In addition, by structurally designing complex prompt engineering, it becomes more accessible for large language models to understand, providing more explicit instructions for large language models, thereby facilitating the full exertion of the performance of large language models.

Figure 2:
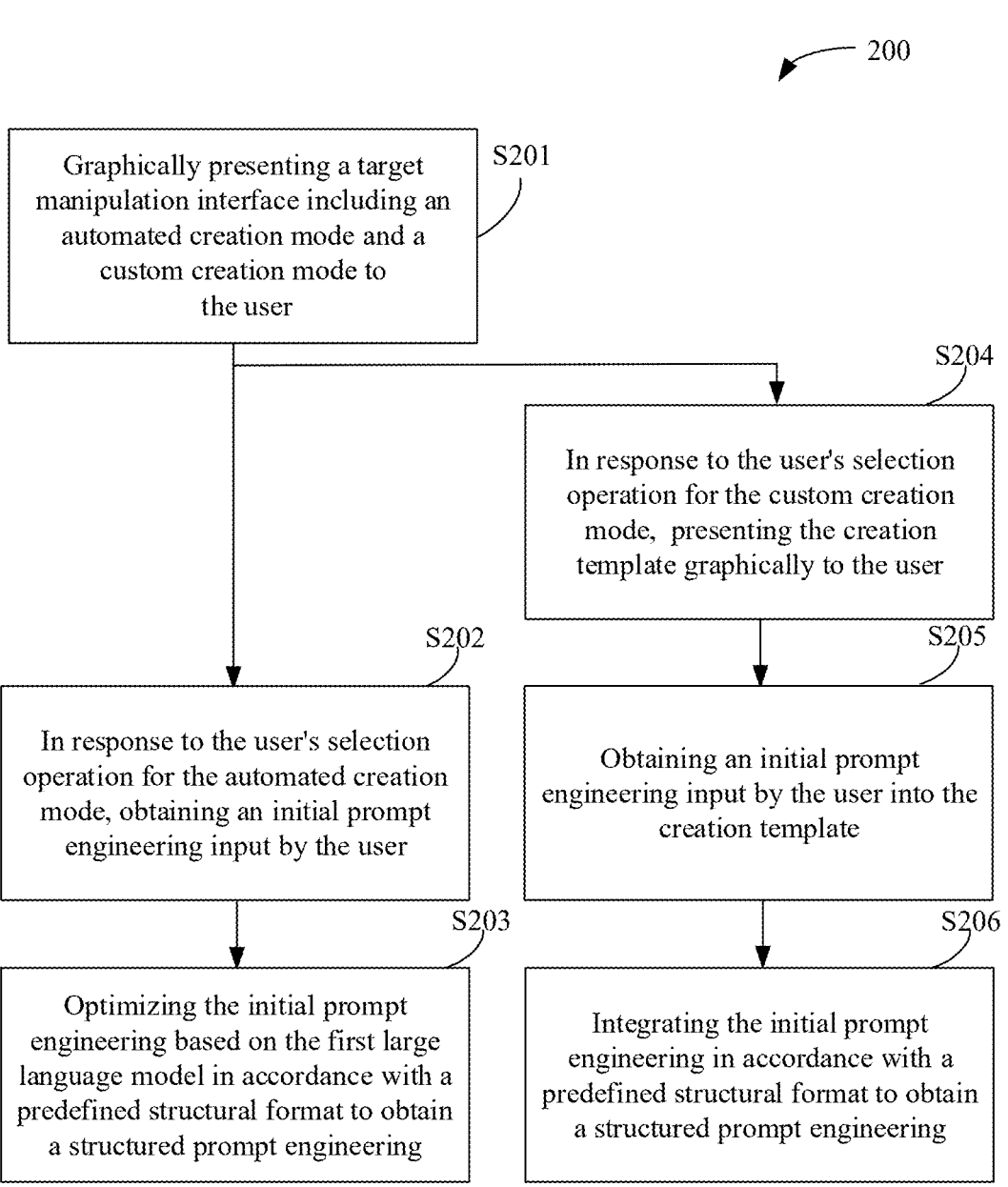
FIG. 2 is an exemplary flowchart illustrating a method for optimizing prompt engineering according to other embodiments of the present disclosure.

FIG. 2 is an exemplary flowchart illustrating a method for optimizing prompt engineering according to other embodiments of the present disclosure. It should be noted that the method 200 can be understood as a further refinement or expansion of the method 100 in FIG. 1. Therefore, the description made for FIG. 1 mentioned above are also applicable to FIG. 2.

As shown in FIG. 2, at step 201, a target manipulation interface including an automated creation mode and a custom creation mode can be graphically presented to the user. In this embodiment, the automated creation mode and the custom creation mode are taken as instances of creation modes that support the structured creation of prompt engineering to further elucidate the specific implementation process of the disclosed scheme. The automated creation mode can be construed as a creation mode for structured creation of the prompt engineering based on a first large language model or other pre-trained language models. The automated creation mode can also be regarded as a creation mode for structured creation of the prompt engineering based on a creation template. It is to be noted that the scheme disclosed herein does not limit the specific types and quantities of creation modes, and specific creation modes can be added or deleted in accordance with application requirements. For example, a mode featuring a prompt engineering library containing multiple prompt engineering can also be displayed on the target manipulation interface, enabling the user to select the required prompt engineering from the prompt engineering library.

In some embodiments, in response to the user's selection operation (such as clicking, selecting, etc.) for automated creation mode, at step S202, an initial prompt engineering input by the user may be obtained. The initial prompt engineering can be understood as fundamental information required for generating the prompt engineering, such as a brief description of the function required by the user. In actual applications, the user can input the initial prompt engineering such as the brief description of the required functions, through manual input, voice input, or other manners.

Subsequently, at step S203, the initial prompt engineering can be optimized based on the first large language model in accordance with a predefined structural format to obtain a structured prompt engineering. The first large language model here can be construed as a pre-trained model that is capable of outputting prompt engineering in accordance with the predefined format. It can be obtained by training some common deep learning models or by newly constructing a language model with the aforementioned functions. In actual applications, when the initial prompt engineering is input into the first large language model, the first large language model can carry out optimization processes such as modification and complementation in accordance with the predefined structural format to obtain a structured prompt engineering.

In some other embodiments, in response to the user's selection operation (such as clicking, selection, etc.) for the custom creation mode, at step S204, a creation template can be presented graphically to the user. In one implementation scenario, a structured prompt menu can be formed in the creation template to assist the user in inputting an initial prompt engineering according to the prompt menu. As an example, prompt menus such as roles, actions, skills, and output formats, etc. are formed in the creation template, and the user can input corresponding content within these prompt menus.

Next, at step S205, the initial prompt engineering input by the user into the creation template can be obtained. In some implementations, the user can input relevant information into the creation template through manual, voice or other manners, and then these input information by the user can be extracted from the creation template as the initial prompt engineering.

Then, at step S206, the initial prompt engineering can be integrated in accordance with the predefined structural format to obtain the structured prompt engineering. In some embodiments, integration processing such as splicing, deletion, and/or supplementation can be performed on the obtained initial prompt engineering in accordance with the predefined structural format to obtain the required structured prompt engineering.

In some other embodiments, in response to the user's selection operation for the aforementioned custom creation mode, the creation template can be graphically presented to the user, and the initial prompt engineering input by the user into the creation template can be obtained. Then, it can be determined whether a selection operation of the user for the automated creation mode is detected. In response that the selection operation of the user for automated creation mode is detected, the initial prompt engineering can be optimized based on the first large language model in accordance with the predefined structural format to obtain the structured prompt engineering. Alternatively, in response that the selection operation of the user for automated creation mode is not detected, the initial prompt engineering is integrated in accordance with the predefined structural format to obtain the structured prompt engineering. Considering that users may have limited knowledge of technologies in the relevant fields and cannot accurately express the required function, which means they cannot provide an accurate initial prompt engineering, in this case, it is advisable to prioritize the custom creation mode. Based on the guidance of the creation template within this custom creation mode, the required initial prompt engineering can be accurately input. Then, the custom creation mode can be continuously adopted as needed to generate the structured prompt engineering, or it can be switched to the automated creation mode and combined with the first large language model to generate the structured prompt engineering. Thereby, the design difficulty of the prompt engineering can be further reduced, and the technical threshold can be effectively lowered to meet the diverse design requirements of users.

Figure 3:
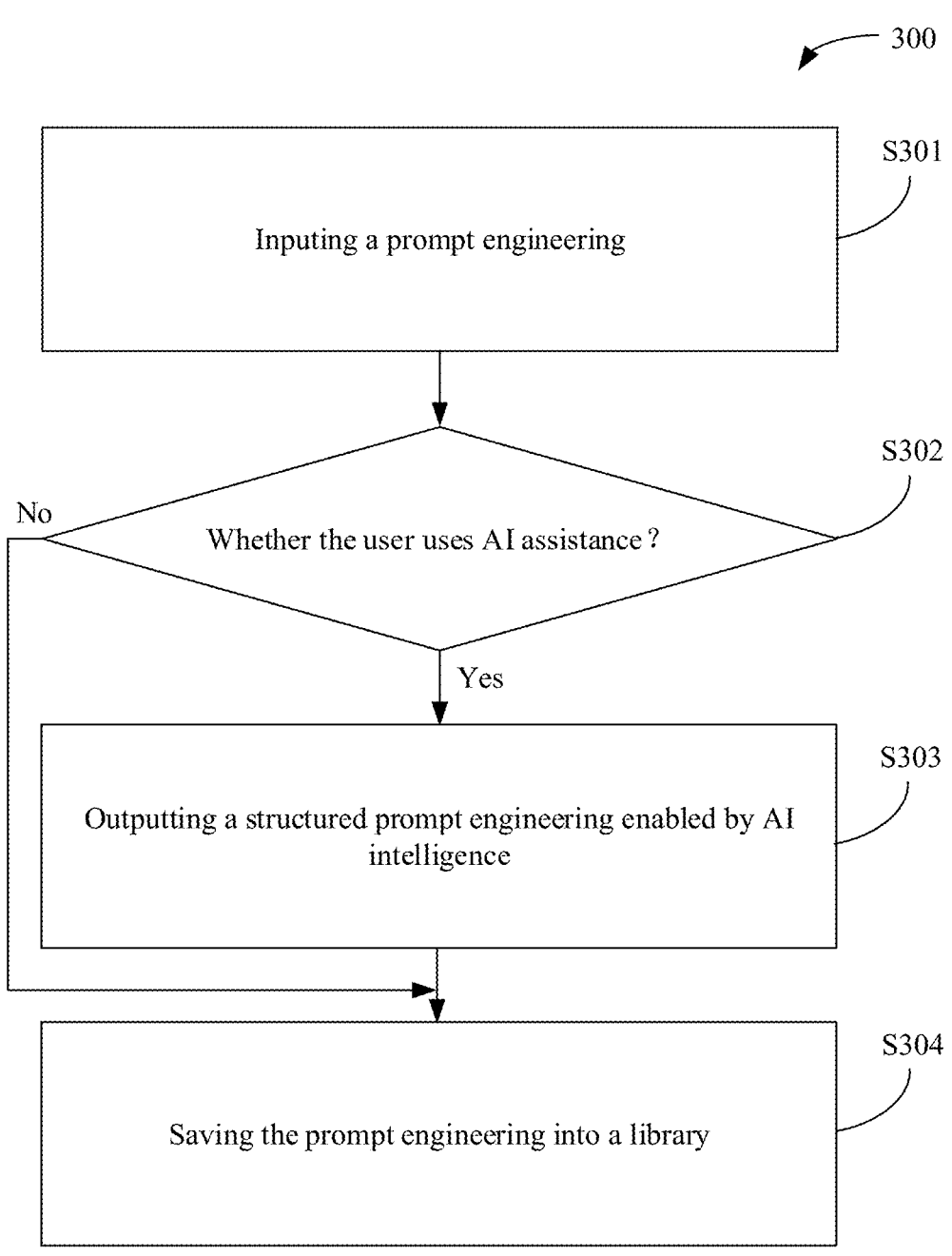
FIG. 3 is an exemplary flowchart illustrating a method for creating prompt engineering through a custom creation mode according to an embodiment of the present disclosure.

FIG. 3 is an exemplary flowchart illustrating a method 300 for creating prompt engineering through a custom creation mode according to an embodiment of the present disclosure. It should be understood that FIG. 3 is an embodiment of the above-mentioned steps S204 to S206 in FIG. 2, and therefore the descriptions made in FIG. 2 also apply to FIG. 3.

As shown in FIG. 3, at step S301, a prompt engineering can be input. The prompt engineering in this step can be understood as an initial prompt engineering input by the user. In some embodiments, when the user selects the custom creation mode, a creation template will be graphically presented to the user, and the user can input the initial prompt engineering under the guidance of the creation template.

As an example, FIG. 4 is an interactive interface diagram of a creation template according to an embodiment of the present disclosure. In FIG. 4, the creation template includes prompt menus such as role, action, skills, and output formats, and the user can input relevant information under the guidance of the prompt menus. It should be noted that the content of the above-mentioned creation template is only an exemplary description and display. The solution disclosed is not limited to this, and the specific content of the creation template can be adjusted and set according to requirements.

Returning to FIG. 3, at step S302, it can be detected whether the user wants to use AI assistance. After the user input the initial prompt information based on the above-mentioned creation template, the user can selectively switch to the automated creation mode, in which a structured creation of the prompt engineering can be executed with the assistance of AI. If it is detected that the user uses AI assistance, step S303 is executed. If it is detected that the user does not use AI assistance, the information in the above-mentioned creation template is integrated to obtain structured prompt information (such as "Integrated prompt" in FIG. 4). In some embodiments, whether AI assistance is used can be determined specifically by whether the user clicks or selects the automated creation mode.

At step S303, the prompt engineering is output in a structured manner in combination with AI intelligent technology. For example, large language models or other types of deep learning models can be used to perform internal complementation and other processing on the initial prompt engineering input by the user, and output the prompt engineering according to the predefined structural format.

At step S304, the aforementioned structured prompt engineering can be saved to a library for subsequent invocation or optimization as needed. Thus, the structured creation of the prompt engineering is completed.

Figure 5:
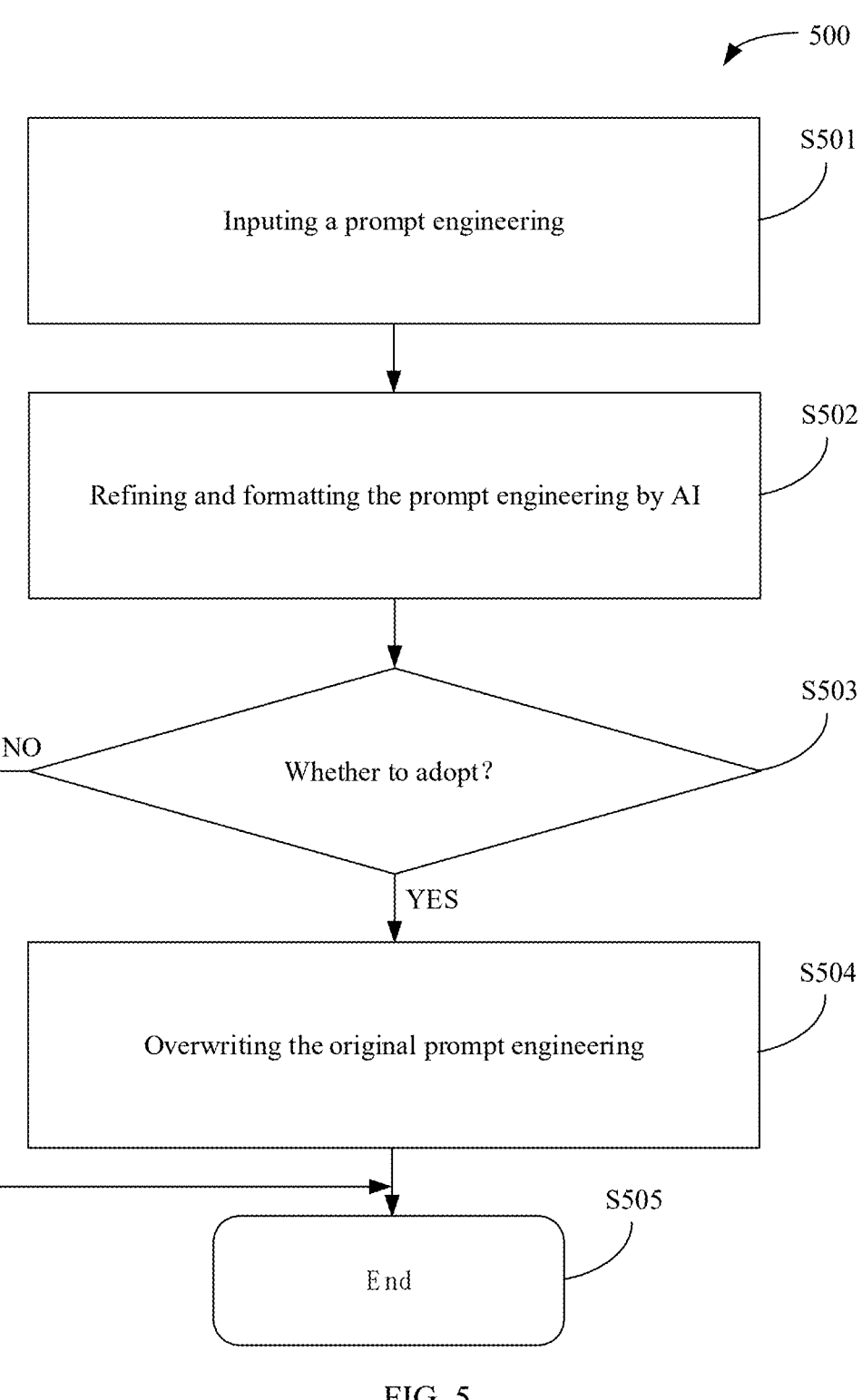
FIG. 5 is an exemplary flowchart illustrating creating prompt engineering through an automated creation mode according to an embodiment of the present disclosure.

FIG. 5 is an exemplary flowchart illustrating a method 500 of creating prompt engineering through an automated creation mode according to an embodiment of the present disclosure. It should be understood that FIG. 5 is an embodiment of the above-mentioned steps S202 and S203 in FIG. 2, and therefore the descriptions made for FIG. 2 above also apply to FIG. 5.

As shown in FIG. 5, at step S501, a prompt engineering can be input. The prompt engineering in this step can be understood as an initial prompt engineering input by the user. In some embodiments, once the user selects the automated creation mode, the user can input the initial prompt engineering manually or through voice into input fields such as the prompt engineering input box or other types of input windows. Naturally, the user also has the option to use the creation template available in the custom creation mode to input the initial prompt engineering.

Next, at step S502, the initial prompt engineering can be refined and formatted based on AI intelligent technology to output a structured prompt engineering. For example, a large language model or other types of deep learning models can be used to perform internal complementation, refinement, format adjustment, etc. on the initial prompt engineering input by the user, and then output the prompt engineering according to a predefined structural format.

Then, at step S503, it is detected whether the above-mentioned structured prompting engineering is adopted. If so, the flow goes forward to step S504, otherwise, the flow jumps to step S505 where this prompt engineering design ends.

At step S504, the structured prompting engineering can overwrite the original prompting engineering (i.e., the initial prompting engineering) to obtain a final prompting engineering.

As an example, FIG. 6 is an interactive interface diagram of prompt engineering created through the automated creation mode according to an embodiment of the present disclosure. In FIG. 6, the user can input a brief description of the required function based on his/her needs, and then large language models and the like can enhance and complement the brief from multiple aspects such as roles, goals, skills, and constraints to obtain a structured prompt engineering. It should be noted that the content in the above interaction interface is only an exemplary description and display. The scheme disclosed is not limited to this, and the specific content of the creation template can be adjusted and set according to requirements.

FIG. 7 is an exemplary flowchart illustrating a method 700 for optimizing prompt engineering according to still other embodiments of the present disclosure. It should be understood that FIG. 7 is a further expansion of the aforementioned FIG. 1, FIG. 2, FIG. 3 and FIG. 5. Therefore, the descriptions made regarding FIG. 1 to FIG. 3 and FIG. 5 are also applicable to FIG. 7.

Normally, after the prompt engineering is created, it will be directly put into use without further optimization. For example, the prompt engineering cannot be dynamically adjusted according to task feedback, which makes it poorly understood by large language models and the like, thereby leading to poor performance of the model in specific circumstances.

Based on this, the scheme disclosed in the present disclosure establishes a training platform to conduct quality assessment on a structured prompt engineering, so as to timely adjust or screen out an optimal prompt engineering according to assessment results, thereby achieving dynamic and continuous optimization of the prompt engineering.

As shown in FIG. 7, at step S701, a structured prompt engineering can be created. As mentioned earlier, a graphical target manipulation interface containing different creation modes can be presented to a user, and in response to the user's selection operation of different creation modes, a structured creation of the prompt engineering can be achieved by using the selected creation mode. The specific creation process of the structured prompt engineering can refer to the relevant descriptions in the previous text, and will not be elaborated here.

Next, the structured prompt engineering can be subject to quality assessment based on a pre-established training platform. The specific execution process of the quality assessment can refer to steps S702 to S704.

At step S702, test tasks and test data for the test tasks related to the structured prompt engineering can be created on the aforementioned training platform. In some embodiments, the created structured prompt engineering can be stored in a library. During the quality assessment stage, the prompt engineering to be assessed can be retrieved from the library for quality assessment. Both the test tasks and the test data can be set and adjusted according to the test requirements. For example, the test tasks can include a variety of tasks such as text generation tasks, automatic question answering, language understanding, etc., and the test data can be obtained from shared datasets related to these test tasks.

In practical applications, test tasks and test data can be created in multiple ways. As an example, a task creation interface can be graphically presented in the aforementioned training platform. The task creation interface specifically can include a task setting column and a test data setting column to support users in setting tasks or test data in the task setting column and the test data setting column. In response to the user's setting operation on the aforementioned task setting column and the test data setting column, the test tasks and test data set based on the task setting column and the test data setting column can be determined. For example, the user can directly input one or more test tasks in the task setting column, or the user can select one or more task options preset within the task setting column as required to determine the corresponding test task(s). For another example, once the user clicks the test data setting column, a list containing multiple datasets can be displayed for the user to choose, or the user can also upload required datasets in the test data setting column.

Furthermore, the user can also divide experimental groups based on the aforementioned test tasks and test data according to the assessment requirements, in order to conduct a more accurate quality assessment of the prompt engineering through multiple experimental groups.

At step S703, a second large language model can be invoked to output test results based on the test data and the structured prompt engineering, and at step S704, the quality assessment of the structured prompt engineering is conducted based on the test results. The second large language model in this embodiment can be obtained by training some general deep learning models, or by newly constructing a language model capable of performing the test tasks. In practical applications, the test data is input into the second large language model, and the second large language model outputs results regarding the test data under the guidance of the structured prompt engineering.

In some embodiments, the aforementioned structured prompt engineering can include multiple prompt engineerings to be assessed. In such case, multiple experimental groups regarding test tasks and test data can be obtained. Each experimental group is configured with a corresponding prompt engineering to be assessed. As an example, the aforementioned task creation interface also includes a grouping setting column to support user's grouping settings within the grouping setting column. In response to the user's editing operation within the grouping setting column, experimental groups edited by the user within the grouping setting column are determined. For example, each time the user clicks the grouping setting column, an additional experimental group can be correspondingly added, and editing operations can be performed on this experimental group, such as setting a group name, configuring a corresponding prompt engineering, setting number of execution of the group, and other operations.

After the division of experimental groupings is completed, the second large language model can be invoked to output test results for each experimental group based on its corresponding prompt engineering to be assessed. Then, scores for the test results of each experimental group are obtained. As an example, a scoring interface can be graphically presented in the training platform. This scoring interface can display the test results of each experimental group and a score setting column for the test results of each experimental group, allowing users to score through the score setting column. Then, the scores input by the user into the score setting column for the test results of each experimental group are obtained. Based on the scores of the test results for each experimental group, the quality of the prompt engineerings under assessment corresponding to each experimental group is determined. With this, the quality assessment of the prompt engineerings to be assessed is completed.

Therefore, the quality assessment of a prompt engineering can be used to assist user in optimizing the prompt engineering. Additionally, the effect of the prompt engineering can be continuously enhanced by configuring experimental branches and combining with the result scoring mechanism, thereby reducing the time cost of manual single-time optimization.

Furthermore, in some embodiments, the quality assessment process of the aforementioned structured prompt engineering can be graphically displayed. For example, an assessment interface is presented in the training platform, and identification information (such as task name or number, etc.) of the test task, execution progress of the test task, scoring progress and scoring result of the structured prompt engineering are displayed on the assessment interface. The user can intuitively understand the relevant assessment information of the prompt engineering through the assessment interface, so that the user can optimize the prompt engineering.

As an example, FIG. 9 presents an exemplary layout of the aforesaid assessment interface. In FIG. 9, the name of the test task, the structured prompt engineering (i.e., the "Template" in the figure), the execution progress of the test task (i.e., the "Status" in the figure), the scoring progress and scoring results of the prompt engineering, etc. can be displayed. It should be noted that the scheme disclosed herein does not impose any restrictions on the specific contents and layout presented by the assessment interface, and additions, deletions or adjustments can be made in accordance with requirements.

Figure 8:
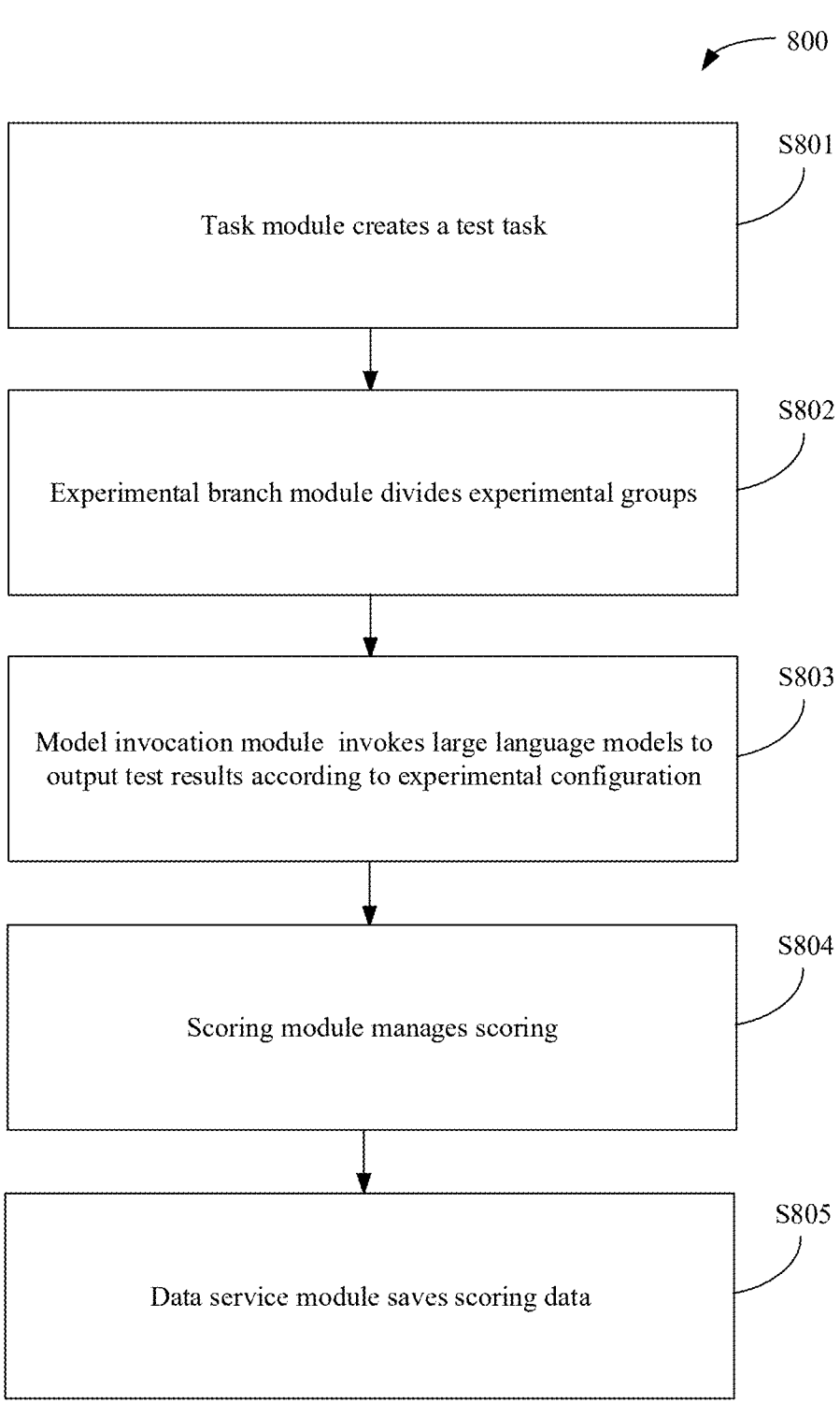
FIG. 8 is an exemplary flowchart illustrating a method for conducting quality assessment on a structured prompt engineering according to an embodiment of the present disclosure.

FIG. 8 is an exemplary flowchart illustrating a method 800 for conducting quality assessment on a structured prompt engineering according to an embodiment of the present disclosure. It should be understood that FIG. 8 is an example of steps S702 to S704 in the aforementioned FIG. 7, Therefore, descriptions above made for FIG. 7 are also applicable to FIG. 8.

In this embodiment, the training platform integrates a task module, an experimental branch module, a model scheduling module, a scoring module, and a data service module. The task module supports creation of test tasks, the experimental branch module supports setting of experimental groups, the model scheduling module supports invocation of large language models, etc. to test the experimental groups, the scoring module supports scoring management of the test results, and the data service module can store the data generated during the assessment process of prompt engineering, such as assessment results, scores and other information. It should be noted that the data service module can be integrated in the training platform or set on the server side, which can be set specifically according to requirements.

In practical applications, the quality assessment of the prompt engineering is accomplished through the collaboration among the aforementioned modules. As shown in FIG. 8, at step S801, the task module can be utilized to create a test task. In some embodiments, a task creation interface can be graphically presented in the aforementioned training platform. The task creation interface specifically can include a task setting column and a test data setting column to support users in setting tasks or test data in the task setting column and the test data setting column. In response to the user's setting operations on the aforementioned task setting column and the test data setting column, the test tasks and test data set within the task setting column and the test data setting column are determined.

Next, at step S802, the experimental branch model can be used to divide experimental groups. In some embodiments, the aforementioned task creation interface further includes a grouping setting column to support the user's grouping settings within the grouping setting column. Each experimental group can be executed multiple times. The scheme disclosed herein does not impose any limitations on the number of experimental groups and the number of executable times, etc.

As an example, as shown in FIG. 10, the task creation interface is provided with a "Task Name" setting column, a "Training Dataset" setting column, and a "Template Configuration" setting column. Through the "Task Name" setting column, the name of the test task can be input. Through the "Training Dataset" setting column, the required test data can be uploaded or selected. Through the "Template Configuration" setting column, experimental groups (such as "testA", "testB") can be set, and experimental configuration (for example, configuring a corresponding prompt engineering, the number of executions, etc.) can be set for each experimental group.

More specifically, when uploading or selecting required test data through the "Training Dataset" setting column, the user can click the "Training Dataset" setting column and the device will present a list containing multiple datasets to the user for selection, as shown in FIG. 11. Of course, the dataset list can be updated as needed. For example, the dataset list can be updated by clicking on "New Data List" or "Import Excel File" on the interface, etc.

Returning to FIG. 8, at step S803, the model invocation module can invoke a large language model to output test results according to the experimental configuration. In some embodiments, when there are multiple experimental groups, the large language model can be invoked to generate test results based on the experimental configuration such as the prompt engineering and the number of executions corresponding to each experimental group.

At step S804, the scoring module can be used to manage the scoring of the test results. In some embodiments, a scoring interface can be graphically presented in the training platform. The scoring interface displays the test results of each experimental group and a scoring setting column for the test results of each experimental group, allowing users to score through the scoring setting column. Then, scores input by the user into the scoring setting column of the test results of each experimental group are obtained.

As an example, as shown in FIG. 12, the scoring interface can display the experimental groups and their experimental configurations, test results, and scores, etc. When the user clicks the "Scoring" setting column, it can jump to a scoring management interface shown in FIG. 13. In FIG. 13, the test results of each experimental group can be displayed. For each experimental group, the score can be set in the scoring setting column. After clicking the "Save" button, the final score will be automatically summarized.

At step S805, the above-mentioned scoring data can be saved through the data service module. For example, the test tasks, test data, experimental groups, test results, scores, etc. involved in the above assessment process can be saved, so that the user can screen out the optimal prompt engineering or select to further optimize the prompt engineering based on the scoring data.

Furthermore, in some embodiments, a management interface of prompt engineering may also be graphically presented on the training platform to facilitate the user's management of the created historical prompt engineerings. As an example, as shown in FIG. 14, on the management interface of prompt engineering, a list of historical prompt engineerings will be displayed, and the user can optimize these historical prompt engineerings. For example, the user can click "New Prompt Version" on the interface to optimize the original prompt engineering. Alternatively, some histori-cal prompt engineerings can also be deleted, etc.

It should be noted that the various interaction diagrams or interaction interfaces involved in the above embodiments are exemplary demonstrations. The scheme disclosed herein does not impose any limitations on the specific contents and layouts in these interaction interfaces. The specific settings and adjustments can be made in combination with applica-tion requirements.

FIG. 15 is an exemplary structural diagram of a device 1500 according to an embodiment of the present disclosure. As shown in FIG. 15, the device 1500 of the present embodiment may include a processor 1501 and a memory 1502, wherein the processor 1501 and the memory 1502 communicate via a bus. The memory 1502 stores program instructions for optimizing prompt engineering. When the program instructions are executed by the processor 1501, the method steps described earlier in conjunction with the accompanying drawings are implemented: presenting a tar-get manipulation interface graphically to a user, wherein different creation modes of prompt engineering are dis-played on the target manipulation interface, and each cre-ation mode supports a structured creation of prompt engi-neering; and in response to the user's selection operation of the different creation modes, adopting the creation mode selected by the user to implement the structured creation of the prompt engineering.

In some embodiments, the creation modes include an automated creation mode based on a first large language model and a custom creation mode based on a creation template.

In some embodiments, the aforementioned memory 1502 can also store program instructions for optimizing prompt engineering. When the program instructions are executed by the processor 1501, the method steps described earlier in conjunction with the accompanying drawings are imple-mented: conducting quality assessment of the structured prompt engineering based on a pre-established training platform.

In some embodiments, the aforementioned memory 1502 can also store program instructions for optimizing prompt engineering. When the program instructions are executed by the processor 1501, the method steps described earlier in conjunction with the accompanying drawings are imple-mented: creating a test task for the structured prompt engi-neering and test data for the test task on the training platform; invoking a second large language model to output test results based on the test data and the structured prompt engineering; and conducting quality assessment of the struc-tured prompt engineering based on the test results.

According to the above description in combination with the accompanying drawings, those skilled in the art can also understand that the embodiments of the present disclosure can also be implemented by a software program. Therefore, the present disclosure also provides a non-transient com-puter-readable storage medium. The non-transient com-puter-readable storage medium stores computer-readable instructions for optimizing prompting engineering, and when the computer-readable instructions are executed by one or more processors, the method described in the present disclosure in combination with any of FIG. 1 to 3, 5, 7 or 8 is implemented.

Through the description of the above embodiments, those skilled in the art can clearly understand that each embodi-ment can be implemented by means of software plus a necessary general hardware platform, or of course by hard-ware. Based on such an understanding, the above technical solution can be essentially or partly embodied in the form of a software product that contributes to the prior art. The computer software product can be stored in a computer-readable storage medium, such as ROM/RAM, a magnetic disk, an optical disk, etc., and includes several instructions for enabling a computer device (which can be a personal computer, a server, or a network device, etc.) to execute the methods described in each embodiment or some parts of the embodiments.

It should be noted that although the operations of the method are described in a particular order in the accompa-nying drawings, this does not require or imply that the operations must be performed in the particular order, or that all the operations shown must be performed to achieve the desired results. On the contrary, the steps depicted in the flowchart can be performed in a different order. Additionally or alternatively, some steps can be omitted, multiple steps can be combined into one step, and/or one step can be decomposed into multiple steps.

Based on the terms provided below, a clearer understand-ing of the previously discussed content can be achieved:

Term A1, A method for optimizing a prompt engineering, including: graphically presenting a target manipulation interface to a user, wherein different creation modes for the prompt engineering are displayed on the target manipulation interface, and each creation mode supports a structured creation of the prompt engineering; and in response to the user's selection operation of the different creation modes, implementing the structured creation of the prompt engi-neering with the creation mode selected by the user.

Term A2, the method according to Term A1, wherein said creation modes include an automated creation mode based on a first large language model and a custom creation mode based on a creation template.

Term A3, the method according to Term A2, wherein said implementing the structured creation of the prompt engi-neering with the creation mode selected by the user includes: in response to the user's selection operation for the auto-mated creation mode, obtaining an initial prompt engineer-ing input by the user; and optimizing the initial prompt engineering based on the first large language model in accordance with a predefined structural format to obtain a structured prompt engineering.

Term A4, the method according to Term A2, wherein said implementing the structured creation of the prompt engi-neering with the creation mode selected by the user includes: in response to the user's selection operation for the custom creation mode, graphically presenting the creation template to the user; obtaining an initial prompt engineering input by the user into the creation template; and integrating the initial prompt engineering in accordance with a predefined structural format to obtain a structured prompt engineering.

Term A5, the method according to Term A2, wherein said implementing the structured creation of the prompt engineering with the creation mode selected by the user includes: in response to the user's selection operation for the custom creation mode, graphically presenting the creation template to the user; obtaining an initial prompt engineering input by the user into the creation template; determining whether the user's selection operation for the automated creation mode is detected; in response that the user's selection operation for the automated creation mode is detected, optimizing the initial prompt engineering based on the first large language model in accordance with a predefined structural format to obtain a structured prompt engineering; or in response that the user's selection operation for the automated creation mode is not detected, integrating the initial prompt engineering in accordance with a predefined structural format to obtain a structured prompt engineering.

Term A6, the method according to Term A1, further including: performing quality assessment on a structured prompt engineering based on a pre-established training platform.

Term A7, the method according to Term A6, wherein said performing quality assessment on a structured prompt engineering based on a pre-established training platform includes: creating a test task regarding the structured prompt engineering and test data for the test task on the training platform; invoking a second large language model to output a test result based on the test data and the structured prompt engineering; and conducting the quality assessment of the structured prompt engineering based on the test result.

Term A8, the method according to Term A7, wherein said creating a test task regarding the structured prompt engineering and test data for the test task on the training platform includes: presenting a task creation interface graphically in the training platform, wherein the task creation interface includes a task setting column and a test data setting column; and in response to the user's setting operations on the task setting column and the test data setting column, determining the test task and test data based on the settings of the task setting column and the test data setting column.

Term A9, the method according to Term A8, wherein said structured prompt engineering includes multiple prompt engineerings to be assessed, and said invoking a second large language model to output a test result based on the test data and the structured prompt engineering, and conducting the quality assessment of the structured prompt engineering based on the test result includes: obtaining multiple experimental groups regarding the test task and the test data, wherein each experimental group is configured with a corresponding prompt engineering to be assessed; invoking the second large language model to output test results for each experimental group based on its corresponding prompt engineering to be assessed; obtaining scores for the test results of each experimental group; and determining the quality of the prompt engineerings to be assessed corresponding to each experimental group based on the scores for the test results of each experimental group.

Term A10, the method according to Term A9, wherein said task creation interface further includes a grouping setting column, and said obtaining multiple experimental groups regarding the test task and the test data includes: in response to the user's editing operation within the grouping setting column, determining the experimental groups edited by the user within the grouping setting column.

Term A11, the method according to Term A9, wherein said obtaining scores for the test results of each experimental group includes: presenting a scoring interface graphically in the training platform, wherein the scoring interface displays the test results of each experimental group and a score setting column for the test results of each experimental group; and obtaining the scores input by the user into the score setting column for the test results of each experimental group.

Term A12, the method according to Term A7, further including: graphically displaying the quality assessment process of the structured prompt engineering.

Term A13, the method according to Term A12, wherein said graphically displaying the quality assessment process of the structured prompt engineering includes: presenting an assessment interface in the training platform, and displaying identification information of the test task, execution progress of the test task, scoring progress and scoring result of the structured prompt engineering on the assessment interface.

Term A14, a device for optimizing a prompt engineering, including: a processor; and a memory having stored thereon computer instructions for optimizing a prompt engineering that, when executed by the processor, cause implementation of: graphically presenting a target manipulation interface to a user, wherein different creation modes for the prompt engineering are displayed on the target manipulation interface, and each creation mode supports a structured creation of the prompt engineering; and in response to the user's selection operation of the different creation modes, implementing the structured creation of the prompt engineering with the creation mode selected by the user.

Term A15, the device according to Term A14, wherein said creation modes include an automated creation mode based on a first large language model and a custom creation mode based on a creation template.

Term A16, the device according to Term A14, wherein said computer instructions are further executed to cause implementation of: performing quality assessment on a structured prompt engineering based on a pre-established training platform.

Term A17, the device according to Term A16, wherein said computer instructions are further executed to cause implementation of: creating a test task regarding the structured prompt engineering and test data for the test task on the training platform; invoking a second large language model to output a test result based on the test data and the structured prompt engineering; and conducting the quality assessment of the structured prompt engineering based on the test result.

Term A18, a non-transitory machine readable medium having stored thereon computer program instructions for optimizing a prompt engineering, which when executed by one or more processors, cause implementing of: graphically presenting a target manipulation interface to a user, wherein different creation modes for the prompt engineering are displayed on the target manipulation interface, and each creation mode supports a structured creation of the prompt engineering; and in response to the user's selection operation of the different creation modes, implementing the structured creation of the prompt engineering with the creation mode selected by the user.

Term A19, the non-transitory machine readable medium according to Term A18, wherein said creation modes include an automated creation mode based on a first large language model and a custom creation mode based on a creation template.

Term A20, the non-transitory machine readable medium according to Term A18, wherein said computer program instructions are further executed to cause implementing of: performing quality assessment on a structured prompt engineering based on a pre-established training platform.

What is claimed is:

1. A method for optimizing a prompt engineering, the method comprising:

graphically presenting a target manipulation interface to a user, wherein different creation modes for the prompt engineering are displayed on the target manipulation interface, and each creation mode supports a structured creation of the prompt engineering;

in response to the user's selection operation of the different creation modes, implementing the structured creation of the prompt engineering with the creation mode selected by the user;

performing quality assessment on a structured prompt engineering based on a pre-established training platform, wherein the performing of the quality assessment comprises:

creating a test task regarding the structured prompt engineering and test data for the test task on the training platform, wherein the creating of the test task comprises:

presenting a task creation interface graphically in the training platform, wherein the task creation interface includes a task setting column and a test data setting column; and in response to the user's setting operations on the task setting column and the test data setting column, determining the test task and test data based on the settings of the task setting column and the test data setting column;

invoking a second large language model to output a test result based on the test data and the structured prompt engineering; and conducting the quality assessment of the structured prompt engineering based on the test result;

wherein the structured prompt engineering includes multiple prompt engineerings to be assessed, and the invoking a second large language model to output a test result based on the test data and the structured prompt engineering, and conducting the quality assessment of the structured prompt engineering based on the test result comprises:

obtaining multiple experimental groups regarding the test task and the test data, wherein each experimental group is configured with a corresponding prompt engineering to be assessed;

invoking the second large language model to output test results for each experimental group based on its corresponding prompt engineering to be assessed;

obtaining scores for the test results of each experimental group; and determining the quality of the prompt engineerings to be assessed corresponding to each experimental group based on the scores for the test results of each experimental group.

2. The method according to claim 1, wherein the creation modes include an automated creation mode based on a first large language model and a custom creation mode based on a creation template.

3. The method according to claim 2, wherein the implementing comprises:

in response to the user's selection operation for the automated creation mode, obtaining an initial prompt engineering input by the user; and optimizing the initial prompt engineering based on the first large language model in accordance with a predefined structural format to obtain a structured prompt engineering.

4. The method according to claim 2, wherein the implementing comprises:

in response to the user's selection operation for the custom creation mode, graphically presenting the creation template to the user;

obtaining an initial prompt engineering input by the user into the creation template; and integrating the initial prompt engineering in accordance with a predefined structural format to obtain a structured prompt engineering.

5. The method according to claim 2, wherein the implementing comprises:

in response to the user's selection operation for the custom creation mode, graphically presenting the creation template to the user;

obtaining an initial prompt engineering input by the user into the creation template;

determining whether the user's selection operation for the automated creation mode is detected;

in response that the user's selection operation for the automated creation mode is detected, optimizing the initial prompt engineering based on the first large language model in accordance with a predefined structural format to obtain a structured prompt engineering; or in response that the user's selection operation for the automated creation mode is not detected, integrating the initial prompt engineering in accordance with a predefined structural format to obtain a structured prompt engineering.

6. The method according to claim 1, wherein the task creation interface further includes a grouping setting column, and the obtaining of the multiple experimental groups comprises: in response to the user's editing operation within the grouping setting column, determining the experimental groups edited by the user within the grouping setting column.

7. The method according to claim 1, wherein the obtaining of the scores for the test results of each experimental group comprises: presenting a scoring interface graphically in the training platform, wherein the scoring interface displays the test results of each experimental group and a score setting column for the test results of each experimental group; and obtaining the scores input by the user into the score setting column for the test results of each experimental group.

8. The method according to claim 1, further comprising: graphically displaying the quality assessment process of the structured prompt engineering.

9. The method according to claim 8, wherein the graphically displaying comprises:

presenting an assessment interface in the training platform, and displaying identification information of the test task, execution progress of the test task, scoring progress and scoring result of the structured prompt engineering on the assessment interface.

10. A device for optimizing a prompt engineering, the device comprising:

a processor; and a memory having stored thereon computer instructions for optimizing a prompt engineering that, when executed by the processor, cause implementation of:

graphically presenting a target manipulation interface to a user, wherein different creation modes for the prompt engineering are displayed on the target manipulation interface, and each creation mode supports a structured creation of the prompt engineering;

in response to the user's selection operation of the different creation modes, implementing the structured creation of the prompt engineering with the creation mode selected by the user;

performing quality assessment on a structured prompt engineering based on a pre-established training platform, wherein the performing of the quality assessment comprises:

creating a test task regarding the structured prompt engineering and test data for the test task on the training platform, wherein the creating of the test task comprises:

presenting a task creation interface graphically in the training platform, wherein the task creation interface includes a task setting column and a test data setting column; and in response to the user's setting operations on the task setting column and the test data setting column, determining the test task and test data based on the settings of the task setting column and the test data setting column;

invoking a second large language model to output a test result based on the test data and the structured prompt engineering; and conducting the quality assessment of the structured prompt engineering based on the test result;

wherein the structured prompt engineering includes multiple prompt engineerings to be assessed, and the invoking a second large language model to output a test result based on the test data and the structured prompt engineering, and conducting the quality assessment of the structured prompt engineering based on the test result comprises:

obtaining multiple experimental groups regarding the test task and the test data, wherein each experimental group is configured with a corresponding prompt engineering to be assessed;

invoking the second large language model to output test results for each experimental group based on its corresponding prompt engineering to be assessed;

obtaining scores for the test results of each experimental group; and determining the quality of the prompt engineerings to be assessed corresponding to each experimental group based on the scores for the test results of each experimental group.

11. The device according to claim 10, wherein the creation modes include an automated creation mode based on a first large language model and a custom creation mode based on a creation template.

12. A non-transitory machine readable medium having stored thereon computer program instructions for optimizing a prompt engineering, which when executed by one or more processors, cause implementing of:

graphically presenting a target manipulation interface to a user, wherein different creation modes for the prompt engineering are displayed on the target manipulation interface, and each creation mode supports a structured creation of the prompt engineering;

in response to the user's selection operation of the different creation modes, implementing the structured creation of the prompt engineering with the creation mode selected by the user;

performing quality assessment on a structured prompt engineering based on a pre-established training platform, wherein the performing of the quality assessment comprises:

creating a test task regarding the structured prompt engineering and test data for the test task on the training platform, wherein the creating of the test task comprises:

presenting a task creation interface graphically in the training platform, wherein the task creation interface includes a task setting column and a test data setting column; and in response to the user's setting operations on the task setting column and the test data setting column, determining the test task and test data based on the settings of the task setting column and the test data setting column;

invoking a second large language model to output a test result based on the test data and the structured prompt engineering; and conducting the quality assessment of the structured prompt engineering based on the test result;

wherein the structured prompt engineering includes multiple prompt engineerings to be assessed, and the invoking a second large language model to output a test result based on the test data and the structured prompt engineering, and conducting the quality assessment of the structured prompt engineering based on the test result comprises:

obtaining multiple experimental groups regarding the test task and the test data, wherein each experimental group is configured with a corresponding prompt engineering to be assessed;

invoking the second large language model to output test results for each experimental group based on its corresponding prompt engineering to be assessed;

obtaining scores for the test results of each experimental group; and determining the quality of the prompt engineerings to be assessed corresponding to each experimental group based on the scores for the test results of each experimental group.

13. The non-transitory machine readable medium according to claim 12, wherein the creation modes include an automated creation mode based on a first large language model and a custom creation mode based on a creation template.

* * * * *